US006101279A

United States Patent [19]
Nguyen et al.

[11] Patent Number: 6,101,279
[45] Date of Patent: Aug. 8, 2000

[54] IMAGE COMPRESSION SYSTEM USING BLOCK TRANSFORMS AND TREE-TYPE COEFFICIENT TRUNCATION

[75] Inventors: Truong Q. Nguyen, Burlington, Mass.; Trac D. Tran, Madison; Yu Hen Hu, Middleton, both of Wis.

[73] Assignee: Wisconsin Alumni Research Foundation, Madison, Wis.

[21] Appl. No.: 09/092,685

[22] Filed: Jun. 5, 1998

Related U.S. Application Data

[60] Provisional application No. 60/048,677, Jun. 5, 1997.

[51] Int. Cl.$^7$ ............................................. G06K 9/00
[52] U.S. Cl. .................................... 382/240; 382/239
[58] Field of Search ................................ 382/232, 233, 382/234, 235, 236, 237, 238, 239, 240, 241, 242, 243, 244, 245, 246, 247, 248, 249, 250, 251, 252, 253; 345/436, 474; 348/699, 403, 408; 708/203, 290, 400, 420

[56] References Cited

U.S. PATENT DOCUMENTS

| | | | |
|---|---|---|---|
| 4,751,742 | 6/1988 | Meeker | 382/41 |
| 5,220,422 | 6/1993 | Oh | 358/133 |
| 5,388,181 | 2/1995 | Anderson et al. | 395/212 |

FOREIGN PATENT DOCUMENTS

WO 97/16021  1/1997  WIPO .

OTHER PUBLICATIONS

PCT Search Report in PCT Appln. No. PCT/US98/11305, dated Sep. 28, 1998. No page #, no place of public., no author.

G. Caso and C.–C. J. Kuo, "New Results for Fractal/Wavelet Image Compression," *SPIE*, 2727–536–547 (1996), XP–002076833.

A. Drygajlo, "New Fast Wavelet Packet Transform Algorithms for Frame Synchronized Speech Processing," Proceedings of Fourth International Conference on Spoken Language Processing, Philadelphia (1996) 1:410–413, XP002076836.

J. Li, et al., "An Embedded DCT Approach to Progressive Image Compression," *IEEE*, (1996), 201–204, XP–002076834.

M. Vetterli, et al., "Wavelets and Subband Coding," (1995) Prentice–Hall (see Sections 2.4.5, 3.5.1 and Chap. 7: "Signal Compression and Subband Coding"). No page #.

S.A. Martucci, et al., "A Zerotree Wavelet Video Coder," *IEEE*, 7:109–118 (1997), XP 000678884.

Ahmad Zandi, et al., Crew: Compression with Reversible Embedded Wavelets, Ricoh California Research Center, Menlo Park CA, no page #, no date.

Amir Said et al., An Image Multiresolution Representation for Lossless and Lossy Compression, SPIE Symposium on Visual Communications and Image Processing, Cambridge, MA, Nov. 1993, No page #.

Amir Said, et al., A New Fast and Efficient Image Codec Based on Set Partitioning in Hierarchical Trees, IEEE Int. Symp. On Circuits and Systems, Chicago IL, May 1993. No page #.

Zixiang Xiong et al., A DCT–based Embedded Image Coder, Princeton University, Princeton, NJ Oct. 3, 1996, no page #.

Trac D. Tran et al., Variable–Length Generalized Lapped Biorthogonal Transform, IEEE Trans. Signal Processing, Apr. 27, 1997, no page 190 .

*Primary Examiner*—Bijan Tadayon
*Attorney, Agent, or Firm*—Quarles & Brady

[57] ABSTRACT

An data compression technique combines the benefits of block-wise processing, such as allows reduced buffer memory usage and improved speed through parallel techniques, with tree-type compression normally associated with wavelet-type compression techniques. Block artifacts in the reconstructed data at the partitions between blocks are minimized by use of lapping transformations.

20 Claims, 5 Drawing Sheets

IMAGE COMPRESSION SYSTEM USING BLOCK TRANSFORMS AND TREE-TYPE COEFFICIENT TRUNCATION

This application is a continuation of the provisional application 60/048,677, filed Jun. 5, 1997.

This invention was made with United States government support awarded by the following agencies:

NSF Grant Nos.: MIP-9501589; MIP-9626563.

The United States has certain rights in this invention.

BACKGROUND OF THE INVENTION

This invention relates generally to data compression methods suitable for the compression of electronic images and specifically to a data compression systems in which the data is divided into blocks for piece-wise compression.

A color image displayed on a typical computer may have the equivalent of one-hundred pages of text information. Higher quality images, such as those of photographic quality, strain the capacity of common data storage media and lake many minutes to transmit over telephone communication channels. Accordingly, with the increasing use of digital cameras and scanners, and the graphics-intensive World Wide Web, techniques for the compression of image and other data have become increasingly important.

A variety of data compression techniques are known to reduce data that must be stored or transmitted. In "lossy" compression schemes, compressed data is irreversibly degraded, for example, by reducing the number of shades of gray for each pixel in an image from 256 to eight. In "loss-less" compression schemes, the data is compressed without loss of information, for example through "zero length encoding" in which a string of zeros in the data (or more generally any pattern of consecutive pixels in an image) is replaced with a shorter code designating that number or pattern. A decompressing program inserts the designated pattern into the data so that the decompressed data is identical to the data before compression.

BLOCK-WISE AND WAVELET COMPRESSION SYSTEMS

Figure 1:
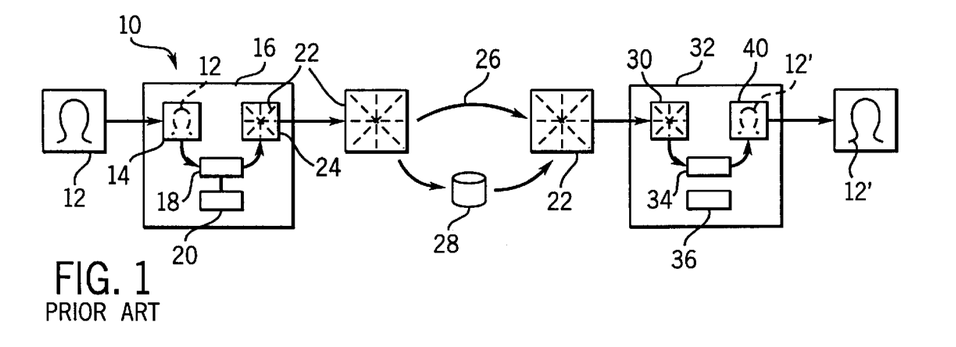
FIG. 1 is a block diagram of a compression decompression system generally understood in the art and showing an uncompressed image and its compressed data as described above.

Referring to FIG. 1, a generalized compression/decompression system 10 receives image data 12, representing a digitized image, which may then be stored in a buffer memory 14 of a computer 16. Image data 12 is depicted for a general case of two-dimensional data but should be understood to represent any data source including one-dimensional, time ordered audio data or three dimensional video data where the third dimension is also time. In the case of audio data, sequential rows of the data depicted represent successive segments of time ordered audio data, in the case of video data the rows and columns of data represent one frame of the video image with additional frames into the dimension perpendicular to the paper.

A processor 18 executing a stored program 20 reads the image data 12 and compresses it into compressed data 22 as it is transferred to a second buffer memory 24. The compressed data 22 may subsequently be sent over the Internet 26 or other communication channel, including satellite communications, where the compressed data requires either a lower bandwidth connection or less time for transmission. Alternatively, the compressed data 22 may be stored in storage media 28 occupying less space.

When it is desired to view the image, the compressed data 22 is retrieved by loading it into a buffer memory 30 of the same or a different computer 32. There it may be read by a processor 34 operating according to a stored decompression program 36 to produce reconstructed image data 12' into a buffer memory 40.

The computers 16 and 32 may be a general microprocessor type computer executing sequential instructions or may be a specialized parallel processor or discrete circuit elements implemented, for example, as a single or small group of integrated circuits according to techniques well known in the art.

Figure 2:
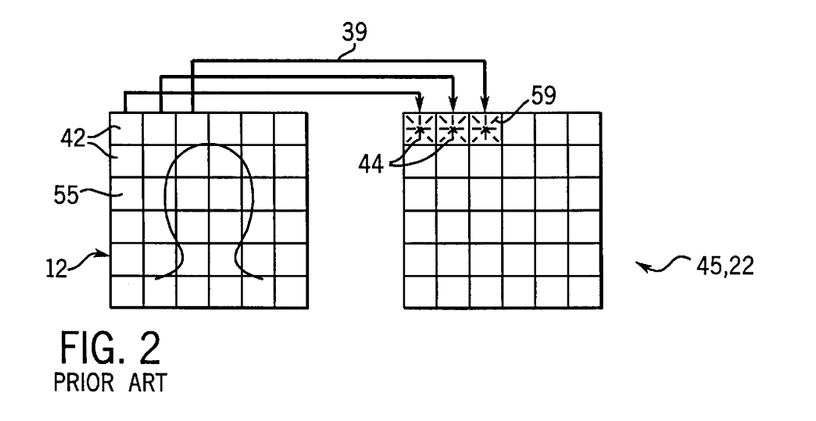
FIG. 2 is a schematic representation of a block-wise compression system showing the uncompressed image as divided into a series of blocks each independently transformed into local coefficient blocks as described above.

Referring now to FIGS. 1 and 2, the amount of buffer memory 14, 24, 30 and 40 required for the transformation process and the time required for the compression and decompression of the image data 12 may be reduced by using block transform process 39 in which the image data 12 is divided into a plurality of image blocks 42 including only a portion of the image data 12. Each image block 42 is operated on individually to produce a local coefficient block 44 of block-wise compressed data 45 for that portion of the image, which may then be transmitted or stored as indicated by arrow 46. Such block transform techniques include the JPEG compression technique in which image blocks 42 of pixels are individually transformed using the discrete cosine transform ("DCT"). The transform is applied to each of the dimensions of the data, so for audio data a one dimensional transform with respect to time is performed, for an image, a two dimensional transformation is applied along the two perpendicular spatial coordinates of the image, and for video, a three dimensional transformation is applied along the two spatial coordinates and time as represented by different video frames.

A compression may be obtained by eliminating zero or low valued coefficients. The coefficients may further be weighted according to empirically determined perceptual values which recognize that not all frequency components of an image are equally valuable in conveying the information of the image.

Figure 3:
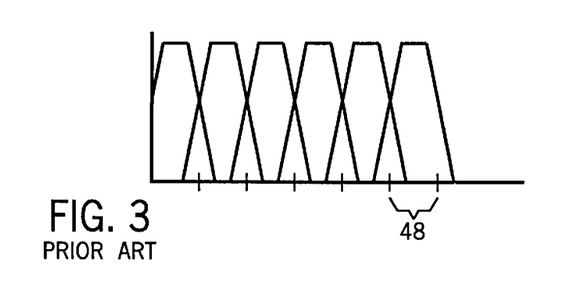
FIG. 3 is a plot of attenuation versus spatial frequency showing a set of filters as may be used to perform the transformation of FIG. 2.

Referring also to FIG. 3, the block transform process divides the frequency spectrum of the pixels of each image block 42 into arbitrarily sized frequency channels 48 each which is associated with a coefficient of a local coefficient block 44. By convention and in this disclosure, the coefficients of the upper right hand corner of the coefficient block are the lowest frequency components and the frequency of the coefficients increase downward and leftward.

The block transform 39 of FIGS. 2 and 3 allows complete flexibility in selecting the shape of the frequency channels 48 to preferentially transform information that is deemed to be most important from a perceptual point of view. The block transform 39 further allows a parallel implementation of the compression (and decompression) process with multiple hardware elements being assigned to each image block 42 to process the blocks 42 at the same time.

One disadvantage to the block transform technique 39 is that at high compression ratios, "block artifacts" show up in the reconstructed image corresponding generally to the divisions of image blocks 42 and resulting from the independent treatment of the blocks in the transformation process. This problem can be reduced by "lapped transforms" in which pixels from neighboring image blocks 42 contribute to the transform coefficients of each local coefficient block 44.

Figure 4:
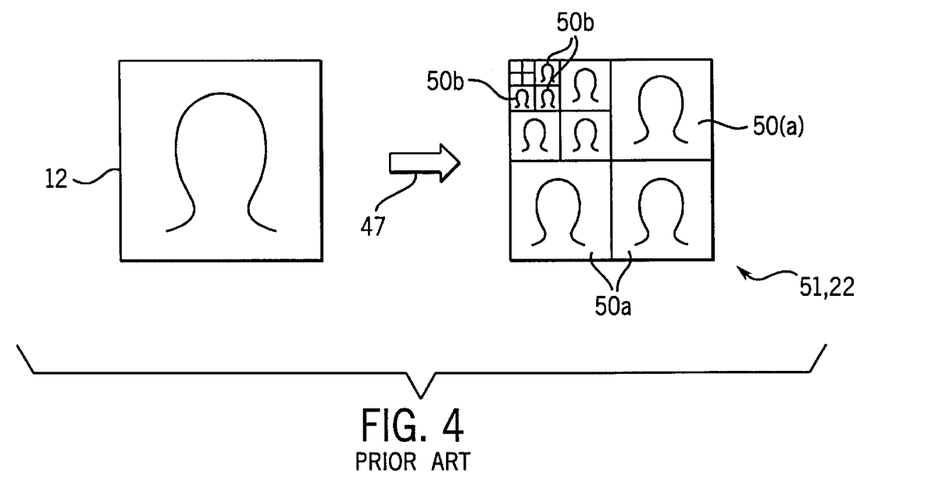
FIG. 4 is a schematic representation analogous to FIG. 2 showing a global or wavelet compression system in which the entire image is transformed into a series of global filtered data blocks 50.
Figure 5:
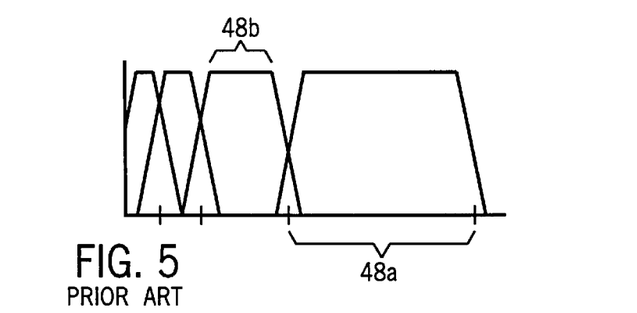
FIG. 5 is a graph similar to that of FIG. 3 showing the bandwidth of the filters implicit in the transformation of FIG. 4 and their octave relationship.

Referring now to FIGS. 4 and 5 block artifacts are largely eliminated in global compression techniques 47 in which the entire image 12 is processed by varying length basis functions or wavelets. A global compression technique 47 operating on image data 12 may start by applying high and low-pass filters to the image, the high-pass filters having channel 48A spanning approximately half the frequency range of the image. The filters are applied along the two dimensions of the image 12 to produce four global filtered data blocks 50a corresponding generally to high and low frequencies of the entire image 12 along different axis. These data are down-sampled without loss of information to reduce their size each to one-fourth of the size of image data 12 without loss of information. Each global filtered data block retains the spatial relationship of the original image, albeit reduced in size. Again the transform may be applied to each of the dimensions of the data 12.

One global filtered data block 50a (not shown) corresponding to the low frequency information is then again filtered into high and low frequency components by filters having channels spanning approximately one-quarter of the total frequency range of the image and positioned within the low half of the frequency range, for example channel 48b representing the high-pass filter of the pair. The result is to produce global filtered data block 50b. This process is repeated again for the low-frequency, global, filtered data blocks 50b with filters having half again the previous channel width for a predetermined number of repetitions corresponding to the limits of the desired frequency resolution.

Figure 6:
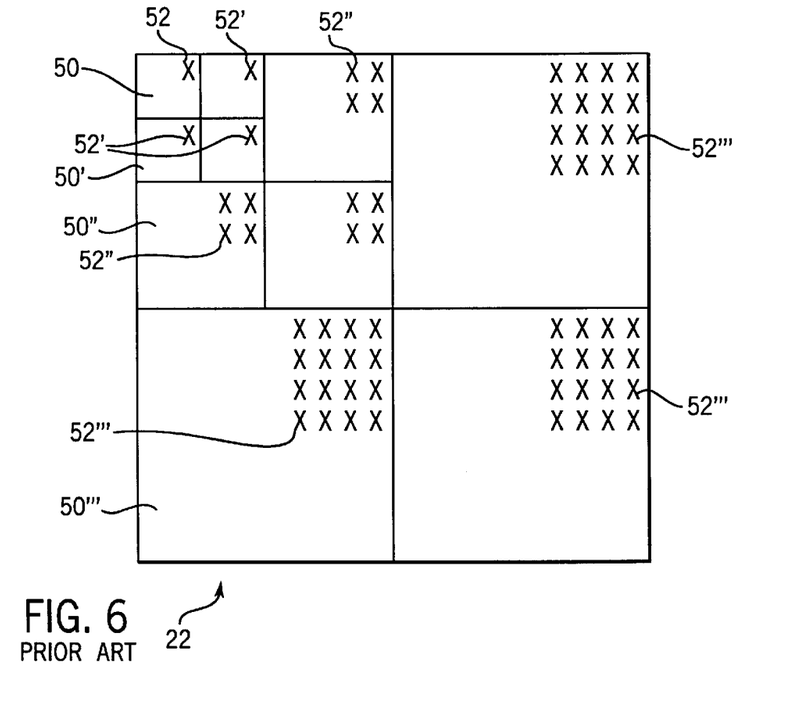
FIG. 6 is a detailed view of the transform data of FIG. 4 showing relationship between data in each global filtered data blocks according to common locations within the original image.

Referring now to FIGS. 4, 5 and 6 it has been recognized that data points of each global filtered data block 50 of such a global compression technique 47 may be grouped as parent and child according to the portion of the image 12 to which they are related. Thus, for example, a single data value 52 in the upper right hand corner of the smallest global filtered data block 50 (representing the DC components of the pixels of the images) may be related to three other filtered data values 52' in surrounding global filtered data block 50' which represent higher frequency coefficients of the same portion of the image 12. These filtered data values 52' are in turn related to four filtered data values 52" of surrounding global filtered data block 50". In turn, each of these data values 52" are related to sixteen filtered data values 52''' representing yet higher frequency components of the same portion of the image 12.

Figure 7:
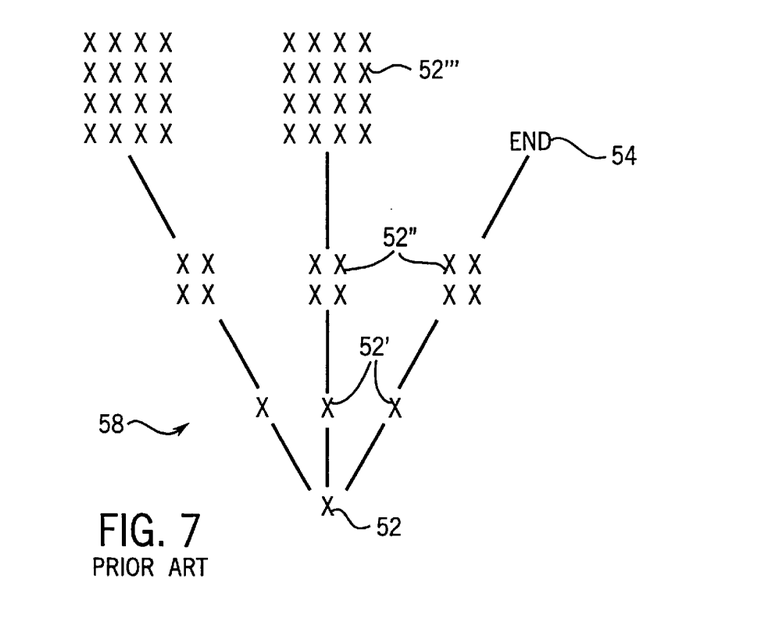
FIG. 7 is a tree diagram showing the data of the global filtered data blocks of FIG. 6 arranged in branches according to their relationship of FIG. 6 and showing the use of a truncation code to eliminate the transmission or storage of data of low value.

Referring now to FIG. 7, this relationship allows each of the filtered data values 52 of the globally compressed data 51 to be related in a tree structure 58 where the root of the tree is data value 52 for global filtered data block 50 with branches formed by filtered data values 52', 52" and 52''' of global filtered data blocks 50', 50" and 50'''. The significance of this tree structure is that it has been recognized that when lower frequency filtered data values 52 are zero or below a predefined threshold it is likely that the filtered data values 52 further up the tree will have low or zero values. Accordingly, a tree truncation technique may be used in which filtered data values 52''', for example, on a given branch that follows a set of filtered data values 52" having zero value, may be replaced with an "end of branch" code 54 of length far less than the filtered data values 52 which it replaces. Thus, the global compression technique 47 provides a further level of tree type compression.

Despite the advantages of the global compression techniques 47 in eliminating block artifacts and in allowing tree type compression, the technique is cumbersome both in requiring large amounts of memory sufficient to hold the entire image 12, and is illsuited to parallel processing. A further disadvantage of the wavelet transformation technique is that the channel sizes of the filters are rigidly fixed in ratios that are multiples of two (octaves) and thus cannot be tailored for optimized transformation.

Ideally the benefits of block transformation and wavelet type transformations could be combined.

SUMMARY OF THE INVENTION

The present inventors have recognized that the coefficients of a block transform process 39 may be mapped into the tree structure of the data of a global transform process 47 and in this way, the truncation techniques associated with such trees may be applied without loosing the advantages of block transformations. Key to the present invention is a determination of the tree type mapping that may be overlaid in a block transform data for the purpose of tree truncation compression.

Specifically, the present invention provides an apparatus and method for compressing the size of a digitized signal that includes a block selector selecting in series portions of digital signal for transformation. A frequency analyzer receives each portion to produce a set of coefficients for each portion. The coefficients represent the frequency content of each portion in a plurality of frequency channels. A tree sequencer relates the coefficients of each portion in a tree structure whose branches relate to common regions of the digital signal within the portions. Such regions may be, for example, similar regions of an image. Finally, a coefficient truncator removes coefficients for branches in the tree structure for each portion beyond a point where coefficients drop below a predetermined threshold.

Thus, it is one object of the invention to provide a further stage of compression of frequency coefficients of block transformed data based on the relationship of the coefficients to each other in a common region of the signal.

The frequency analyzer may provide coefficients with at least two adjacent channels having bandwidths not related by a multiple of two.

Thus, it is another object of the invention to provide the benefits of block transformation of digital signals without the need to conform to a rigid octave filter structure such as is normally associated with wavelet type analysis.

The frequency analyzer may analyze the portions of the digital signal along at least one dimension having a first number of digitized samples according to a second number of frequency channels less than the first number.

Thus, it is another object of the invention to eliminate the block artifacts normally associated with block transform type compression systems by generating the coefficients of each block both from data samples within the block and a region outside of that block. Generally, the present invention provides complete flexibility in mixing the features of global and block transforms.

The apparatus may further include a quantizer receiving coefficients and quantizing them to a predetermined bit length and an entropy encoder operating on the coefficients to further compress the data of the coefficients.

Thus, it is another object of the invention to provide a compression system that may incorporate other well understood compression elements normally associated with block transform techniques.

The foregoing and other objects and advantages of the invention will appear from the following description. In this description references made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 8:
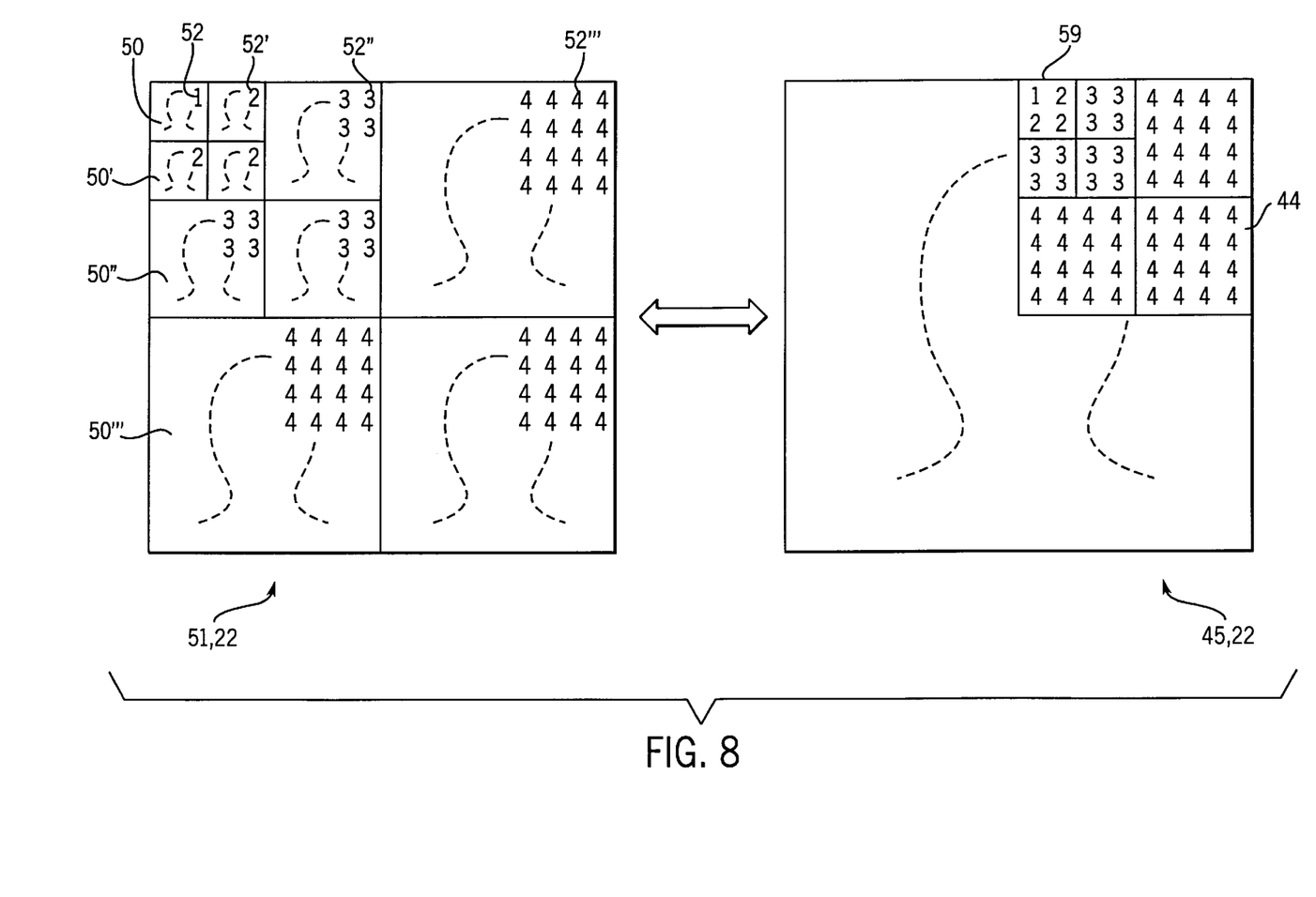
FIG. 8 is a representation of the global filtered data blocks of FIG. 6 as remapped to form the local coefficients blocks of FIG. 2 according to the present invention thus providing a tree mapping for the blocks of FIG. 2.

Referring now to FIG. 8, the present inventors have recognized that the filtered data values 52 of globally compressed data 51 (as described above with respect to FIGS. 4–7) may be remapped to form coefficients 59 of block-wise compressed data 45. This operation is performed by collecting the filtered data values 52 of the globally compressed data 51 according to their tree structure 58 (shown in FIG. 7) into a single local coefficient block 44 of the block-wise compressed data 45.

Specifically, the smallest global filtered data block 50 of the globally compressed data 51 may be divided itself into a number of blocks each holding one data value 52 and each corresponding to one local coefficient block 44 encompassing the same portion of the image. Thus, for a given data value 52 in the upper right hand corner of the global filtered data block 50 in the upper left hand corner, a local coefficient block 44 will be developed located in the upper right hand corner of the block-wise compressed data 45. Data value 52 will be placed in the upper left hand corner of local coefficient block 44. The related filtered data values 52' which are the children of the data value 52 (as described previously with respect to FIG. 7) will be placed adjacent to data value 52 in local coefficient block 44 to correspond with their relative locations in the global filtered data blocks 50' from which they came. Similarly, filtered data values 52" and 52'" will be placed about their parent coefficients to fill local coefficient block 44.

This local coefficient block 44 represents a miniature wavelet transformation of the data of that portion of the image 12 covered by the filtered data values 52.

It will be understood that similarly, the coefficients 59 of a block transform 39 (of FIG. 2) can be given a hierarchy according to the mapping just described with the parent data being considered the data in the upper left hand corner of each coefficient block 44 and the children coefficients progressively surrounding it as depicted in FIG. 8. Thus, the tree structure 58 of FIG. 7 and the truncation described with respect to FIG. 7 may be applied directly to the block-wise compressed data 45 of the coefficient blocks 44 using the hierarchy so established.

In each coefficient block 44, the upper left hand value represents the DC component of the data of the corresponding image block 42. Generally there will be a residual correlation between these DC components among coefficient block 42. This correlation may be reduced by collecting the DC components (or any subgroup of coefficients) and performing a second level of compression, e.g., using the global compression technique on this collection of coefficients. The effect of this compression is both to reduce correlation and to reduce block artifacts, as it has an effectively larger window that the initial image blocks 12.

Figure 9:
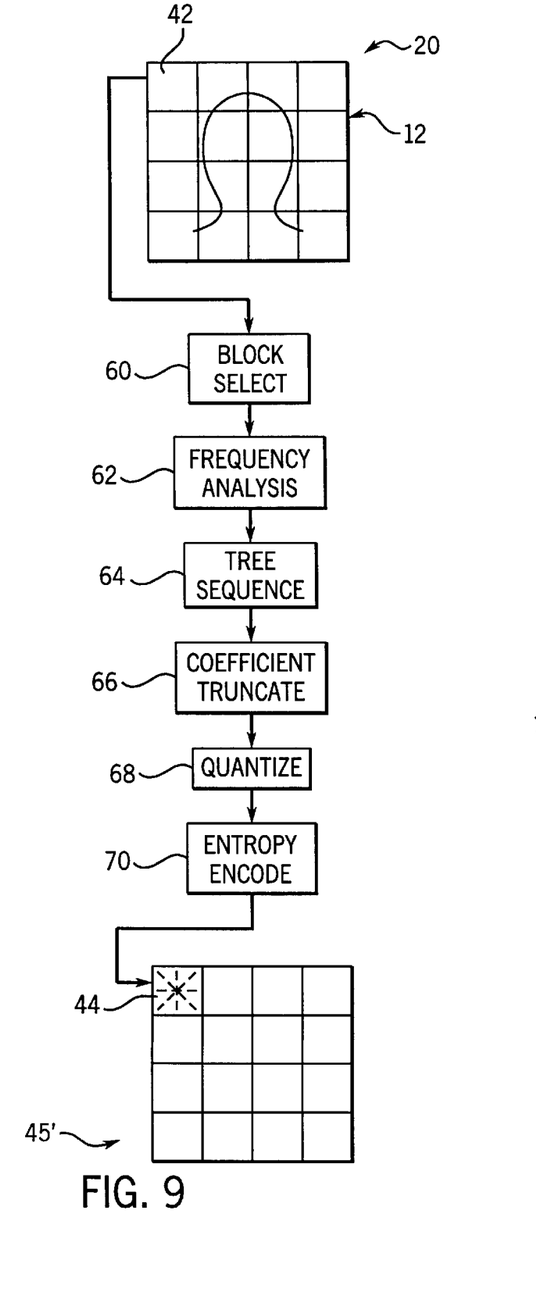
FIG. 9 is a flowchart showing the steps of the present invention in compressing an image on a block basis while using the tree type truncation made possible by the relationship of FIG. 8.
Figure 11:
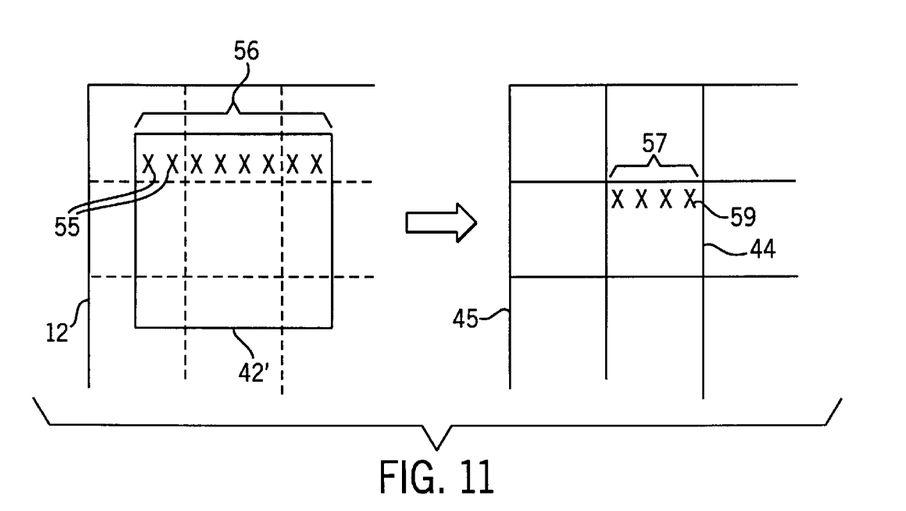
FIG. 11 is a graphical representation of a lapping technique used in the present invention to reduce block artifacts in the reconstructed image.

Referring now to FIG. 9 compression using this technique may begin at process block 60 wherein the image data 12 is divided into image blocks 42 which may be independently processed. Referring momentarily to FIG. 11 the image blocks 42' may have a dimension greater than the dimension of the coefficient blocks 44 that will be ultimately produced. The dimension 56 of the image blocks 42' is determined by the number of image data values 55 encompassed by the image blocks 42 whereas the dimensions 57 of the local coefficient block 44 is determined by the number of coefficients 59 generated which in turn is related to the number of channels 48 into which the frequency data is divided as described with respect to FIG. 3 above.

By making the dimensions 56 larger than dimensions 57 certain data values 55 will contribute to multiple coefficient blocks 44 thus providing an overlap in the transformation process that reduces block artifacts.

Referring again to FIG. 9, at succeeding process block 62 the data of each block is transformed, for example, using the discrete cosine transformation applied along the two dimensions of the block 42 of an image 12. A local coefficient block 44, such as is shown in FIG. 8, is thus produced and a tree sequence may be imposed upon that data according to the parent/child hierarchy previously described with respect to the globally compressed data 51 of FIG. 8, as shown by process block 64.

Each branch of the tree structure so created is followed until filtered data values 52 are identified below a predetermined threshold as indicated by process block 66. The threshold is determined by the degree of compression desired. Subsequent coefficients 59 are then truncated by the insertion in the data of an "end of branch" character. Generally, this will mean outer blocks of greater distance from data value 52 may be wholly discarded.

The coefficients 59 are then quantized at process block 68 according to methods well-known in the art such as may reduce the coefficients to integer values and which may serve to apply additional perceptual weighting to the coefficient values. Successive levels of transformation may be performed for the DC components as described above.

At succeeding process block 70 entropy encoding may be performed such as "Huffmann coding" in which frequently transmitted coefficients are assigned short bit representations, "bit plane coding" in which most significant bits are transmitted prior or instead of least significant bits, or "arithmetic coding", all well understood in the art.

The truncated set of coefficients may be transmitted or stored as the block-wise compressed data 45.

Figure 10:
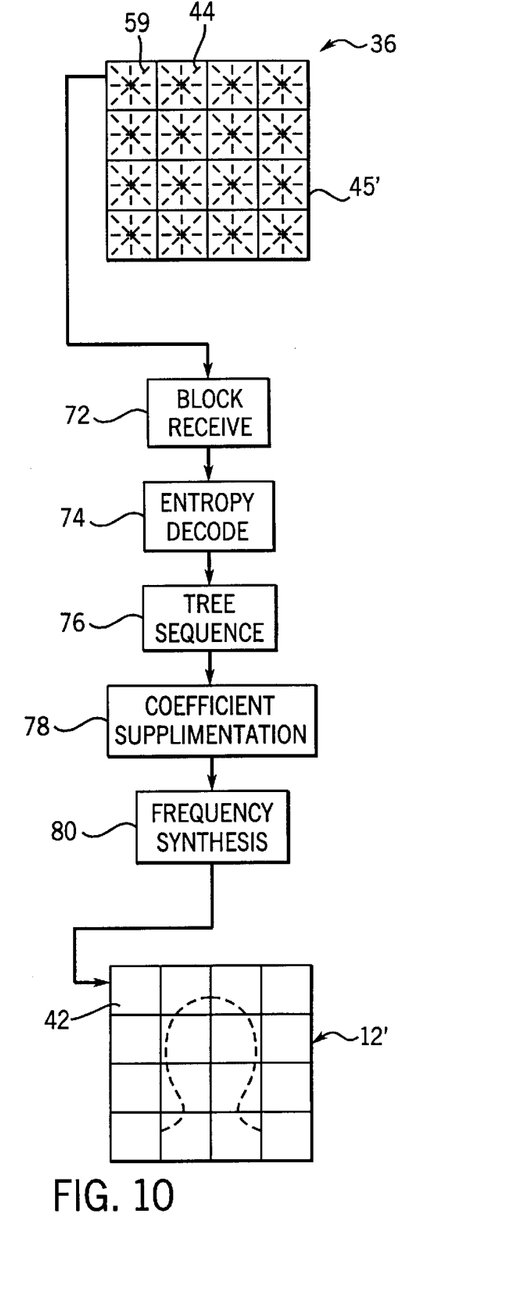
FIG. 10 is a FIG. similar to FIG. 9 showing the decompression of an image compressed according to the steps of FIG. 9.

Referring now to FIG. 10, a reconstruction of the image data 12' from block-wise compressed data 45' uses the same steps in reverse order with the local coefficient block 44 of the block-wise compressed data 45 being received at a block reception step 72 where an entropy decoding stage provides the reconstructed coefficients depending on the entropy encoding previously used, as is understood in the art.

The coefficients 59 are then reviewed in the tree sequence described with respect to FIGS. 7 and 8, at process block 76, and at process block 78 missing coefficients are supplied typically by padding the missing coefficients with zero values.

The coefficients as reconstructed are then used to frequency synthesize actual data values 55 per process block 80 to reconstruct a given image block 42 of the image data 12. Generally the steps of frequency analysis of step 62 and frequency synthesis of step 80 are simply reverse transformations of each other depending on the particular selection of frequency channel shapes.

Each of the above described blocks 60 through 80 may be implemented by processing on the computer 16 or 32 with each coefficient and each data block processed in sequence. Alternatively, a specialized parallel processing circuitry may be used according to techniques well-known in the art.

The above description has been that of a preferred embodiment of the present invention. It will occur to those that practice the art that many modifications may be made without departing from the spirit and scope of the invention. For example, the invention is applicable to a wide variety of frequency transformations beyond the discrete cosine transformed described herein wherein the coefficients may be linked in a tree structure according to their origins in the image. Although the preferred embodiment is implemented in software executed by on a computer, it will be understood to those of ordinary skill in the art that the software steps may be likewise implemented in hardware according to known techniques. Generally, although the invention has been described with respect to processing of image and audio data, compression of general data may be done.

We claim:

1. An apparatus for compressing the size of a digitized signal comprising:

a block selector selecting a series of portions of the digital signal;

a frequency analyzer producing a set of coefficients for each portion, the coefficients representing the frequency content of each portion in a plurality of frequency channels;

a tree sequencer relating the coefficients of each portion in a tree structure according to regions of the digital signal within the portions; and a coefficient truncator removing coefficients for branches in the tree structure for each portion beyond a point where the coefficients drop below a predetermined threshold;

whereby a compressed digital signal of coefficients is produced.

2. The apparatus of claim 1 wherein the frequency analyzer provides coefficients within at least two adjacent channels having bandwidths not related by a multiple of two.

3. The apparatus of claim 1 wherein the frequency analyzer analyzes the portions along at least one dimension having a first number of digitized samples according to a second number of frequency channels less than the first number.

4. The apparatus of claim 1 including further a quantizer receiving the coefficients and quantizing them to a predetermined bit-length.

5. The apparatus of claim 1 including further an entropy encoder operating on the coefficients to further compress the data of the coefficients.

6. The apparatus of claim 1 wherein the block selector, frequency analyzer, tree sequencer, and coefficient truncator are implemented on an electronic computer operating according to a stored program.

7. The apparatus of claim 1 wherein the digital signal is an image and the portions are areas of the image and wherein the frequency analyzer performs a two-dimensional analyses of the digital signal.

8. The apparatus of claim 1 wherein the digital signal is an audio signal and the portions are intervals of the audio signal and wherein the frequency analyzer performs a one-dimensional analyses of the digital signal.

9. The apparatus of claim 1 wherein the digital signal is a video signal and the portions are areas of a video frame and successive frames and wherein the frequency analyzer performs a three-dimensional analyses of the digital signal.

10. The apparatus of claim 1 wherein the channels are substantially equal bandwidth.

11. The apparatus of claim 1 including a second frequency analyzer further compressing at least a subset of the coefficients from the first frequency analyzer to produce the compressed digital signal of coefficients.

12. An apparatus for decompressing a compressed digitized signal comprising:

a block receiver receiving the compressed digital signal as coefficients of predefined frequency channels, the coefficients collected in a series of blocks related to portions of the uncompressed digitized signal;

a tree sequencer relating the coefficients of each block in a tree structure according to predefined regions within the portions of the uncompressed digital signal;

a coefficient supplimentor adding coefficients to branches in the tree structure where the coefficients drop below a predetermined threshold and have been truncated; and a frequency synthesizer producing a set of frequency signals related to the coefficients to reconstruct the uncompressed digital signal.

13. The apparatus of claim 12 wherein the frequency synthesizer produces frequency signals for sequential coefficients having bandwidths not related by a multiple of two.

14. The apparatus of claim 12 wherein the frequency synthesizer produces frequency signals having at least one dimension including a first lumber of digitized samples greater in number than the number of predefined frequency channels.

15. The apparatus of claim 12 including further an entropy decoder operating on the coefficients to decompress the data of the coefficients.

16. The apparatus of claim 12 wherein the block receiver, the tree sequencer, coefficient supplimentor, and the frequency synthesizer are implemented on an electronic computer operating according to a stored program.

17. The apparatus of claim 12 wherein the digital signal is an image and the portions are areas of the image and wherein the frequency synthesizer creates frequency signals in two-dimensions.

18. The apparatus of claim 12 wherein the digital signal is an audio signal and the portions are intervals of the audio signal and wherein the frequency synthesizer creates frequency signals in one dimension.

19. The apparatus of claim 1 wherein the digital signal is a video signal and the portions are areas of a video frame and successive frames and wherein the frequency analyzer performs a three-dimensional analyses of the digital signal.

20. The apparatus of claim 1 including a second frequency synthesizer producing at least a subset of the compressed digital signal from further compressed coefficients.

* * * * *

UNITED STATES PATENT AND TRADEMARK OFFICE
CERTIFICATE OF CORRECTION

PATENT NO. : 6,101,279
DATED : August 8, 2000
INVENTOR(S) : Truong Q. Nguyen, et al.

It is certified that error appears in the above-identified patent and that said Letters Patent is hereby corrected as shown below:

```
At column 1, line 21, replace [lake] with --take--.

At column 3, line 18, replace [range,for] with --range, for--.

In claim 14, replace [lumber] with --number--.
```

Signed and Sealed this

Twenty-ninth Day of May, 2001

Attest:

NICHOLAS P. GODICI

Attesting Officer

Acting Director of the United States Patent and Trademark Office